United States Patent Office
3,454,597
Patented July 8, 1969

3,454,597
CYCLIC SULFATES AND THEIR PREPARATION
Yu-Lan Chang Tong, Walnut Creek, Calif., and Donald A. Tomalia and David P. Sheetz, Midland, Mich., assignors to The Dow Chemical Company, Midland, Mich., a corporation of Delaware
No Drawing. Filed Nov. 14, 1966, Ser. No. 593,709
Int. Cl. C07d 89/08; B01j 1/12
U.S. Cl. 260—327       14 Claims

ABSTRACT OF THE DISCLOSURE

Compounds of the formulae

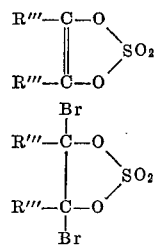

and

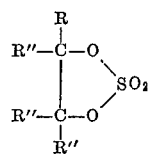

wherein R represents chloro or fluoro; R' represents hydrogen, methyl, or phenyl; each R'' represents R or R', there being at least one R'' moiety which represents R'; and each R''' independently represents chloro, fluoro, hydrogen, methyl or phenyl, are useful as agents for the control of bacteria and fungi. Methods for the preparation of the compounds by halogenation or halogen exchange are disclosed.

---

The present invention is concerned with cyclic sulfates and is directed, in particular, to new cyclic sulfate compounds and to processes for the preparation of these new compounds.

An understanding of the subject matter with which the present application is concerned will be facilitated by reference to the following general reaction scheme:

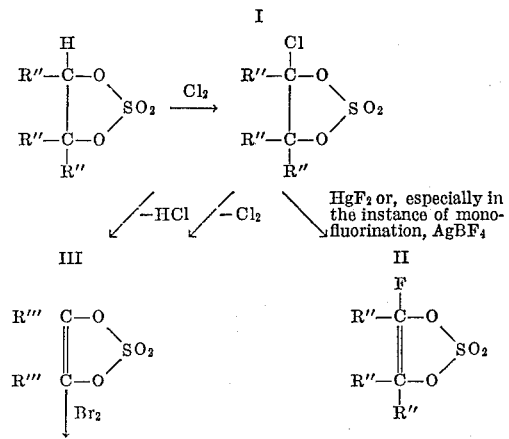

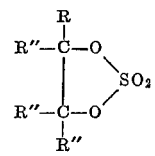

The new compounds of the present invention are those of Formulae I, II, III, and IV. Formula I and II can be seen as designating sub-genera of a genus of Formula V:

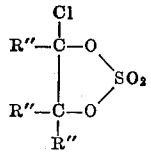

In the above and succeeding formulae in the present specification and claims, R represents chloro or fluoro; R' represents hydrogen, methyl, or phenyl; each R'' represents R or R', there being at least one R'' moiety which represents R'; and each R''' independently represents chloro, fluoro, hydrogen, methyl, or phenyl. The new processes of the present invention are those for the synthesis of compounds of Formulae I, II, and III. A more detailed description of the various embodiments of the present invention follows:

PART I—CHLORINATED ETHYLENE SULFATES

In one embodiment, the present invention is directed to chlorinated ethylene sulfate products of Formula I:

I
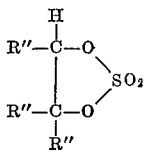

and to methods for their synthesis. The products defined by Formula I are crystalline solids or viscous liquid materials. They are useful as agents to control the growth of bacteria, fungi, and other related microorganisms. They are also useful as starting materials to prepare (a) the products of Formula II, and (b) the products of Formula III.

While, in advance, it might have been expected that the products of Formula I could readily be synthesized by any of the various methods for chlorination, only one method has been found to be suitable. This method comprises the contacting of elementarl chlorine and an ethylene sulfate starting material of the formula $$R''-\overset{H}{\underset{R''}{C}}-O \diagdown \atop R''-C-O \diagup SO_2$$

the contacting being carried out under the influence of ultraviolet light. By this method, the desired chlorination of the starting material takes place.

The contacting is most conveniently effected by employing the chlorine in its typical gaseous form and by employing an inert liquid reaction medium, preferably one in which the ethylene sulfate reactant is at least moderately soluble. Suitable and preferred reaction media include the chlorinated hydrocarbons, especially chloroform and carbon tetrachloride; however, other reaction media can be used. Hence, a preferred embodiment of the chlorination process comprises bubbling chlorine gas into a liquid solution comprising a chlorinated hydrocarbon and ethylene sulfate reactant, under the influence of ultraviolet light.

The temperature at which the reaction is carried out is not critical, the reaction going forward under temperatures of a wide range, such as from 50° C. to 200° C.; conveniently, the reaction is carried out at the reflux temperature of the reaction medium. Similarly, the pressure at which the reaction is carried out is not critical; the reaction goes forward at subatmospheric, as well as superatmospheric, pressures; however, no advantage is generally afforded by the employment of such pressures, and the reaction is therefore usually carried out at atmospheric pressures. Furthermore, the intensity of ultraviolet light under the influence of which the chlorination process is carried out is not critical, some of the desired chlorinated product being obtained in the presence of low levels of such light. The ultraviolet light is conveniently provided by the use of a commercial "sun" lamp, positioned near the reaction vessel. When the reaction is carried out on a laboratory scale, good results are achieved with a 250 watt sun lamp positioned from 0 to 6 inches from the reaction vessel.

The chlorination process frequently yields product mixtures which range from monochloro materials up to and including trichloro materials. No tetrachloro product has been isolated and it is possible that the existence of such a substance is precluded by the electron-withdrawing influence exerted on the reactive site of the trichloro substance which would serve as precursor. Control of product composition is achieved by selection of the amounts of the reactants and by control of the rate of contacting the ethylene sulfate reactant with chlorine, typically by control of the rate at which chlorine gas is bubbled into a liquid solution comprising reaction medium and the ethylene sulfate reactant. The reaction consumes the reactants in amounts representing stoichiometric proportions. The synthesis of monochloro products is favored by employing such proportions, or only a slight excess of chlorine. The synthesis of the di- and the trichloro products is favored by the employment of the chlorine in excess of the stoichiometric amount, such as a ten to fifty fold excess. Furthermore, formation of products having fewer chlorine atoms, particularly monochloro materials, is favored by a slower rate of chlorine, addition, such as a rate of 60 millimoles per hour. The formation of products having two or three chlorine atoms is favored by a faster rate of chlorine addition, such as a rate of 120 millimoles per hour. Generally, product composition is also effected by choice or organic liquid as solvent: the employment of chloroform as solvent selectively favors production of the monochloro product; carbon tetrachloride, on the other hand, favors the production of di- and trihalo products. Thus, by appropriate selection of amounts of reactants; of solvent; and of rate of chlorine addition, the present process can be employed to obtain the specific product desired in good yield.

The reaction ordinarily proceeds at a relatively slow, but steady, rate, dependent upon chlorine addition. Following the completion of the chlorine addition, the reaction is ordinarily complete; however, it is sometimes desirable, especially in the instance of the di- and trichloro products, to permit the reaction mixture to stand for a period of time following completion of the chlorine addition, to assure completion of the reaction. Following any such standing period, the reaction medium is removed from the reaction mixture by evaporation under subatmospheric pressure, thereby obtaining the product as a residue.

As noted, the product residue, by appropriate selection of reaction conditions, may comprise a high yield of only one of the products; or, in the absence of such selection, the product residue may comprise a mixture of several or all of the products. When a mixture of products is obtained, or when it is desired to purify a product obtained, by selection of reaction conditions, in good yield, separation can be achieved by conventional procedures. Most typically, the product or product mixture obtained by removal of reaction medium is a liquid residue and fractional distillation of such residue is utilized to achieve the desired separation. The separated product or products can also be purified, if desired, in such conventional procedures as recrystallization and the like.

Certain products, those wherein each of the carbon atoms of the 1,3,2-dioxathiolane ring bears two unlike substituents, each of which is methyl, phenyl, or fluoro, admit of geometrical isomerism, and the form of the product is the same as that of the starting material employed. Thus, for example, when it is desired to obtain the trans product, the corresponding trans starting material is employed.

The following examples illustrate the present embodiment of the invention and will enable those skilled in the art to practice the same.

Example 1.—Chlorination of 1,3,2-dioxathiolane-2,2-dioxide employing carbon tetrachloride 1,3,2-dioxathiolane-2,2-dioxide (74.5 grams; 0.6 mole) and 150 milliliters of carbon tetrachloride were mixed and the resulting mixture heated to reflux. A 250 watt sunlamp was positioned 2–4 inches from the reaction vessel as gaseous chlorine was passed into the reaction mixture at a rate of 60 millimoles per hour. Progress of the reaction was monitored by sampling and analysis by nuclear magnetic resonance spectroscopy (hereinafter N.M.R. analysis) at fifteen, twenty-two, and thirty-nine hours following the beginning of chlorine addition. The products and product composition of each of the samples is reported in the following table:

| Reaction time in hours | Product composition (in mole percent) | | | |
| --- | --- | --- | --- | --- |
| | 4-chloro-1,3,2-dioxa-thiolane-2,2-dioxide | trans-4,5-dichloro-1,3,2-dioxa-thiolane-2,2-dioxide | 4,4-di-chloro-1,3,2-dioxa-thiolane-2,2-dioxide | 4,4,5-tri-chloro-1,3,2-dioxa-thiolane-2,2-dioxide |
| 15 | 68 | 11 | 4 | |
| 22 | 65 | 23 | 9 | |
| 39 | 24 | 55 | 17 | 3 |

Example 2

Nitrogen was bubbled through the reaction mixture obtained as reported in Example 1 for twenty minutes and the carbon tetrachloride removed by evaporation under subatmospheric pressure to obtain a product residue. This product residue was purified by dilution with diethyl ether and treatment with 12 grams of each of anhydrous magnesium sulfate and potassium carbonate. Thereafter, the mixture was filtered and ether removed by evaporation under subatmospheric pressure. The product mixture thus obtained was distilled under vacuum. Three fractions were obtained, the first boiling at 40° C./0.7 mm., the second boiling at 48–49° C./0.7 mm. and the third at 81–83° C./1.8 mm. Analyses of the fractions by infrared spectroscopy, nuclear magnetic resonance spectroscopy (N.M.R.) and elemental analysis established that the first fraction was 4,4-dichloro-1,3,2-dioxathiolane-2,2-dioxide, a liquid having a refractive index $n_D^{25}$ of 1.4502; N.M.R. analysis showed a singlet at −5.15 p.p.m. (Neat); −5.12 p.p.m. ($CDCl_3$); and at −5.12 p.p.m. ($CCl_4$). The second fraction was established as being trans-4,5-dichloro-1,3,2-dioxathiolane-2,2-dioxide, a crystalline solid melting at 48–49° C.; N.M.R. analysis showed a singlet at −6.54 p.p.m. (Neat); at −6.51 p.p.m. ($CDCl_3$) and at −6.46 p.p.m. ($CCl_4$). The third fraction was established as being the mono-chlorinated product, 4-chloro-1,3,2-dioxathiolane-2,2-dioxide, a liquid having a refractive index $n_D^{25}$ of 1.4505; N.M.R. analysis showed a quartet at −4.48, −5.04, and −6.54 p.pm. ($CDCl_3$).

Example 3.—Chlorination of 1,3,2-dioxathiolane-2,2-dioxide employing chloroform 1,3,2-dioxathiolane-2,2-dioxide (37.2 grams; 0.3 mole) and 60 milliliters of chloroform were mixed, and the resulting mixture heated to, and thereafter maintained at, reflux temperature under the influence of ultraviolet provided by a sunlamp. Chlorine addition was then begun, at the rate of 60 millimoles per hour, and continued at that rate for fifty-nine hours. Samples withdrawn at the end of thirteen, thirty-one, and fifty-nine hours, and subjected to N.M.R. analysis, showed the following product composition:

| Reaction time in hours | Product composition (in mole percent) | | | |
| --- | --- | --- | --- | --- |
| | 4-chloro-1,3,2-dioxa-thiolane-2,2-dioxide | trans-4,5-dichloro-1,3,2-dioxa-thiolane-2,2-dioxide | 4,4-di-chloro-1,3,2-dioxa-thiolane-2,2-dioxide | 4,4,5-tri-chloro-1,3,2-dioxa-thiolane-2,2-dioxide |
| 13 | 90 | | | |
| 31 | 74 | 19 | | |
| 59 | 61 | 30 | 9 | |

Example 4.—Chlorination of 1,3,2-dioxathiolane-2,2-dioxide employing carbon tetrachloride 1,3,2-dioxathiolane-2,2-dioxide (24.8 grams; 0.2 mole) and 60 milliliters of carbon tetrachloride were mixed together, and the resulting mixture heated to, and thereafter maintained at, reflux temperature. A sunlamp was positioned near the reaction mixture to provide an ultraviolet light source. Chlorine addition, at the rate of 120 millimoles per hour, was begun and continued for a period of twenty hours. At this time, the reaction mixture was subjected to N.M.R. analysis, which established the presence of 4,4,5-trichloro-1,3,2-dioxathiolane-2,2-dioxide product (singlet at −6.78 p.p.m. (Neat); at −6.70 p.p.m. ($CDCl_3$); and at −6.65 p.p.m. ($CCl_4$)). The analysis also established the presence of trans-4,5-dichloro-1,3,2-dioxathiolane-2,2-dioxide product. The remaining product of the mixture showed a singlet at −5.30 p.p.m. ($CCl_4$) and was assumed to be the cis-4,5-dichloro-1,3,2-dioxathiolane-2,2-dioxide product.

The product composition, expressed in mole percent, was as follows:

| | Percent |
| --- | --- |
| 4,4,5-trichloro-1,3,2-dioxathiolane-2,2-dioxide | 35 |
| Trans-4,5-dichloro-1,3,2-dioxathiolane-2,2-dioxide | 46 |
| Cis-4,5-dichloro-1,3,2-dioxathiolane-2,2-dioxide | 10 |
| 4,4-dichloro-1,3,2-dioxathiolane-2,2-dioxide | 9 |

No monochloro product (4-chloro-1,3,2-dioxathiolane-2,2-dioxide) was observed.

Representative other products of the present embodiment of the invention include the following:

Example 5

By chlorination of 4,4-diphenyl-1,3,2-dioxathiolane-2,2-dioxide, 5 - chloro - 4,4-diphenyl-1,3,2-dioxathiolane-2,2-dioxide product having a molecular weight of 310.8.

Example 6

By chlorination of 4-fluoro-1,3,2-dioxathiolane-2,2-dioxide, prepared as described hereinbelow, 5-chloro-4-fluoro-1,3,2-dioxathiolane-2,2-dioxide product having a molecular weight of 176.6.

Example 7

By chlorination of 4-phenyl-1,3,2-dioxathiolane-2,2-dioxide, 5,5 - dichloro - 4-phenyl-1,3,2-dioxathiolane-2,2-dioxide product having a molecular weight of 269.1.

Example 8

By chlorination of 4-methyl-1,3,2-dioxathiolane-2,2-dioxide, 4,5,5 - trichloro - 4-methyl-1,3,2-dioxathiolane-2,2-dioxide product having a molecular weight of 241.5.

Example 9

By chlorination of trans-4,5-dimethyl-1,3,2-dioxathiolane-2,2-dioxide, trans-4,5-diochloro-4,5-dimethyl-1,3,2-dioxathiolane-3,2-dioxide product having a molecular weight of 221.1.

Example 10

By chlorination of 4,4,5-trimethyl-1,3,2-dioxathiolane-2,2-dioxide, 5-chloro-4,4,5-trimethyl-1,3,2 - dioxathiolane-2,2-dioxide product having a molecular weight of 200.7.

Example 11

By chlorination of 4-methyl-5-phenyl-1,3,2-dioxathiolane - 2,2-dioxide, 4-chloro-4-methyl-5-phenyl-1,3,2-dioxathiolane-2,2-dioxide product having a molecular weight of 248.7.

Example 12

By further chlorination of 4-chloro-1,3,2-dioxathiolane-2-dioxide, a mixture of 4,4-dichloro-1,3,2-dioxathiolane-2,2-dioxide, trans-4,5-dichloro-1,3,2-dioxathiolane-2,2-dioxide, and 4,4,5-trichloro-1,3,2-dioxathiolane-2,2-dioxide.

The starting materials to be employed in accordance with this embodiment:

$$R''-\underset{\underset{R''}{|}}{\overset{\overset{H}{|}}{C}}-O \diagdown \atop R''-\underset{\underset{R''}{|}}{C}-O \diagup SO_2$$

are prepared in known procedures whereby a diol of the formula:

$$R''-\underset{\underset{R''}{|}}{\overset{\overset{H}{|}}{C}}-OH \atop R''-\underset{|}{C}-OH$$

is reacted with thionyl chloride to obtain the corresponding sulfite:

$$R''-\underset{\underset{R''}{|}}{\overset{\overset{H}{|}}{C}}-O \diagdown \atop R''-\underset{|}{C}-O \diagup SO$$

which can then be oxidized, such as by reaction with permanganate, to obtain the desired starting material.

PART II—FLUORINATED ETHYLENE SULFATES

In another embodiment, the present invention is directed to fluorinated ethylene sulfate products and methods for their synthesis. These products are of the formula II
$$R''-\underset{\underset{R''}{|}}{\overset{\overset{F}{|}}{C}}-O \diagdown \atop R''-\underset{|}{C}-O \diagup SO_2$$

As set forth hereinafter, the symbol R is employed to designate chloro or fluoro; the symbol R', to designate hydrogen, methyl, or phenyl; and each symbol R'', to designate R or R', there being at least one R'' moiety which represents R'. The products thus defined are crystalline solids or viscous liquid materials. They are useful as agents to control the growth of bacteria, fungi, and other microorganisms.

All of the fluorinated products of Formula II are prepared in a process which comprises the reaction of a corresponding chlorinated product of Formula I:

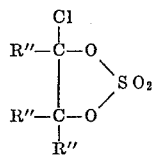

with mercuric fluoride. The reaction is conveniently carried out in an inert liquid reaction medium; the halogenated hydrocarbons, such as chloroform, carbon tetrachloride, and methylene chloride, are suitable for this purpose. The reaction goes forward under a wide range of temperature and pressure conditions. Generally, it is preferred to conduct the reaction at temperatures of from −10 to 15° C., or, yet more preferred, at temperatures of about 0° C., and at atmospheric pressure.

The reaction consumes the reactants in amounts representing stoichiometric proportions; and the stoichiometry of the reaction is dependet upon the number of chlorine substituents in the chlorinated starting material it is desired to replace. Thus, for example, 4,4,5-trichloro-1,3,2-dioxathiolane-1,2,2-dioxide bears three substituents, one, two, or all three of which can be displaced with fluorine. Generally, replacement of less than all the chlorine substituents results in product mixtures; this is minimized by employment of the reactants in stoichiometric amounts. However, where all chlorine substituents on the starting material are to be replaced by fluorine, higher yields are obtained by employing the mercuric fluoride in excess of the stoichiometric amount, such as a one to five fold excess.

In carrying out the reaction, the reactants are contacted with one another, conveniently in the presence of inert liquid reaction medium, in the reaction temperature range. The reaction generally goes forward readily, with the production of the desired product and of mercuric chloride byproduct, both substances generally appearing in the reaction mixture as a precipitate. Following completion of the contacting of the reactants, the reaction mixture can be held for a period of time in the reaction temperature range to insure completion of the reaction. Thereafter, the product is separated, and, if desired, purified, by conventional procedures. Most typically, the reaction medium is removed by evaporation under subatmospheric pressure to separate the product and byproduct as a residue and the byproduct then removed by fractional crystallization.

It has been discovered that many of the fluorinated products of the present invention can also be prepared in an alternate synthesis method. In this method, particularly applicable to those fluorinated products wherein there is only one fluorine atom, a chlorinated starting material of Formula I:

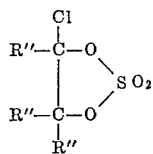

is reacted with silver tetrafluoroborate, thereby replacing at least one chlorine atom. The reaction is conveniently carried out in an inert liquid reaction medium, preferably a liquid in which the $AgBF_4$ reactant is at least moderately soluble. Suitable such solvents include acetonitrile, nitromethane, and, especially, diethyl ether. The precise amounts of the reactants employed are not critical, some of the desired product being obtained when employing the reactants in any amounts. However, the reaction consumes the reactants in stiochiometric amounts, and it is accordingly preferred to employ the reactants in such amounts. The reaction proceeds readily under a wide range of temperatures; however, higher yields are obtained if the reaction is carried out at temperatures of 20–50° C., or, even more preferably, at temperatures of about 25° C. The reaction is conveniently and preferably conducted at atmospheric pressure.

The reaction results in the production of the expected corresponding fluorinated product and of silver chloride byproduct, the latter substance ordinarily appearing in the reaction mixture as a precipitate. Separation and, if desired, purification of the separated product, are carried out in conventional procedures. Most typically, the byproduct is removed by filtration and liquid reaction medium removed by evaporation under subatmospheric pressure to separate the product which can then be purified.

The following examples illustrate this embodiment of the invention and will enable those skilled in the art to practice the same.

Example 13.—Fluorination of 4-chloro-1,3,2-dioxathiolane-2,2-dioxide with mercuric fluoride Mercuric fluoride (23 grams; 0.1 mole) was mixed with 50 milliliters of carbon tetrachloride and the resulting mixture cooled with stirring to a temperature of 0–5° C. 4-chloro-1,3,2-dioxathiolane-2,2-dioxide (7.92 grams; 0.05 mole) was added portionwise with stirring to the cooled mixture. The reaction mixture was then held with stirring, at a temperature of 0–5° C., for an additional period of 1½ hours. At the end of this period, the carbon tetrachloride was decanted from the reaction mixture, and the resulting solid washed five times with 20-milliliter portions of chloroform. The chloroform solutions were combined and concentrated by removal of the solvent on a rotating evaporator, and the concentrate sublimed to obtain the expected 4-fluoro-1,3,2-dioxathiolane-2,2-dioxide product, melting at 48–50° C.

Example 14.—Fluorination of 4-chloro-1,3,2-dioxathiolane-2,2-dioxide with silver tetrafluoroborate Silver tetrafluoroborate (3.2 grams; 16.5 millimoles) was mixed with 50 milliliters of diethyl ether. Thereafter, 4-chloro-1,3,2-dioxathiolane-2,2-dioxide (2.6 grams; 16.5 millimoles) was added portionwise over a period of time at room temperature. The resulting reaction mixture was permitted to stand for 2½ days at room temperature and then filtered to separate silver chloride byproduct. The filtrate was washed with a saturated sodium bicarbonate solution until testing showed that it was neutral. Thereafter, the washed filtrate was treated with activated carbon and dried over anhydrous magnesium sulfate. The resulting solution was concentrated to about one-third the original volume by evaporation under subatmospheric pressure. n-Hexane was added portionwise to the concentrated solution until precipitation of the desired 4-fluoro-1,3,2-dioxathiolane-2,2-dioxide product occurred. The product was separated by filtration and found to melt at 49–50° C.

All of the fluorinated products of the present embodiment are prepared in accordance with the foregoing teachings. Other representative fluorinated products, and the corresponding chlorinated products of Part I which serve as starting materials, include the following:

Example 15

From 4-chloro-5-methyl-1,3,2-dioxathiolane-2,2-dioxide and mercuric fluoride, 4-fluoro-5-methyl-1,3,2-dioxathiolane-2,2-dioxide product having a molecular weight of 156.1.

Example 16

From 4-chloro-5,5-diphenyl-1,3,2-dioxathiolane-2,2-dioxide and silver tetrafluoroborate, 4-fluoro-5,5-diphenyl-1,3,2-dioxathiolane-2,2-dioxide product having a molecular weight of 293.3.

9

Example 17

From trans-4,5-dichloro-1,3,2-dioxathiolane-2,2-dioxide and mercuric fluoride, trans-4,5-difluoro-1,3,2-dioxathiolane-2,2-dioxide product having a molecular weight of 178.1.

Example 18

From a mixture of cis/trans-4,5-dichloro-4,5-dimethyl-1,3,2-dioxathiolane-2,2-dioxide and mercuric fluoride, cis/trans-4,5-difluoro-4,5-dimethyl - 1,3,2 - dioxathiolane-2,2-dioxide product having a molecular weight of 188.2.

Example 19

From 4-chloro-4,5,5-trimethyl-1,3,2-dioxathiolane-2,2-dioxide and silver tetrafluoroborate, 4-fluoro-4,5,5-trimethyl-1,3,2-dioxathiolane-2,2-dioxide product having a molecular weight of 184.2.

Example 20

From 4,4,5-trichloro-1,3,2-dioxathiolane - 2,2 - dioxide and mercuric fluoride, 5-fluoro-4,4-dichloro-1,3,2-dioxathiolane-2,2-dioxide product having a molecular weight of 211.0.

PART III—VINYLENE SULFATES

Most of the chlorinated products of Part I, hereinabove, can be reacted further to obtain unsaturated products of Formula III, earlier set forth and here repeated:

III 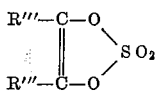

In this formula, as previously, each R''' independently represents chloro, fluoro, hydrogen, methyl, or phenyl. Hence, another embodiment of the present invention is concerned with the vinylene sulfate products of Formula III and with methods for their synthesis. These products are useful as agents to control the growth of bacteria, fungi, and other microorganisms; they are also useful as intermediates to prepare yet other products, those of Formula IV.

The vinylene sulfate products of the present embodiment are prepared in several methods of synthesis. In a first method, a mono-chlorinated starting material prepared in accordance with Part II and of the formula:

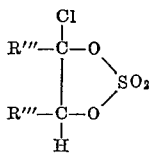

is dehydrohalogenated, by pyrolysis, to yield the corresponding vinylene sulfate product. And, in another synthesis method a di-chlorinated starting material prepared in accordance with Part II of the formula

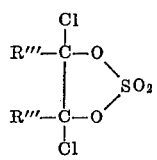

is dehalogenated to similarly obtain the vinylene sulfate product of the present embodiment.

In carrying out the pyrolysis reaction, the mono-chlorinated starting material is contacted with silver acetate; the reaction proceeds as shown in the following reaction scheme:

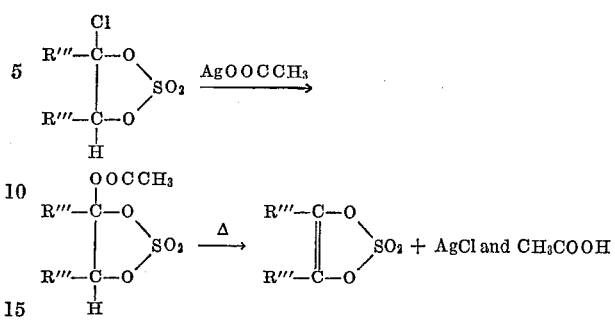

The contacting of the reactants is conveniently and preferably carried out in an inert liquid reaction medium. Suitable such media include acetonitrile, tetrahydrofuran, and nitromethane. The temperature at which the reaction is conducted is not critical, the reaction going forward at temperatures between the freezing and boiling points of the reaction mixture; however, progress of the reaction is greatly facilitated by elevated temperatures, such as temperatures of 60–80° C.

The amounts of the reactants employed are not critical. However, the reaction consumes the reactants in amounts representing equimolecular proportions, and the use of such amounts is preferred in that it is more efficient as to the employment of starting materials. The reaction proceeds readily, with the preparation of the desired vinylene sulfate product and of silver chloride and acetic acid byproducts; the silver chloride byproduct appears in the reaction mixture as a precipitate and is readily separated by filtration or decantation. Reaction medium and acetic acid byproduct are removed in conventional procedures, thereby separating the desired product as a residue. This product residue can then be purified, if desired, in conventional procedures.

The dehalogenation reaction for the preparation of the vinylene sulfate products of the present embodiment comprises the reaction of the di-chlorinated starting material either (a) with zinc dust in dimethylacetamide or (b) with metallic magnesium ("magnesium turnings") in tetrahydrofuran. Of these two general procedures, the latter is preferred inasmuch as certain of the resulting products, notably 1,3,2-dioxathiole-2,2-dioxide, have been found to form an azeotrope with dimethylacetamide. In the latter procedure, no such deterrent to separation of the product arises.

In carrying out the dehalogenation reaction, by either procedure, the di-chlorinated starting material is contacted with the selected metal and solvent. In the instance of these di-chlorinated starting materials which admit of geometrical isomerism, it is preferred to use the trans form. The reaction goes forward under temperatures of wide range, but is preferably conducted in a temperature range of from 25° C. to the boiling temperature of the solvent employed. Conveniently, the reaction mixture is heated to reflux. Although the reaction goes forward readily, it is generally preferred that the reaction mixture be held for a period of time in the reaction tempearture range following completion of the contacting together of the reactants.

The amounts of the reactants employed are not critical, some of the desired product being obtained when employing the reactants in any amounts. However, better yields are obtained when the dichlorinated starting material and magnesium or zinc reactants are employed in stoichiometric amounts in sufficient solvent to completely disperse the reactants. In the instance of magnesium and tetrahydrofuran, the latter may be activated by the employment of a minor amount of 1,2-dichloroethane.

Following the completion of the reaction, the reaction mixture is filtered to remove unreacted portions of the metal employed, and solvent is removed in any of the conventional procedures for the same. As a result of these operations, the desired unsaturated product is obtained as a residue. This product residue can be purified in conventional procedures.

The following examples illustrate the present embodiment of the invention and will enable those skilled in the art to practice the same.

Example 21.—Preparation of 1,3,2-dioxathiole-2,2-dioxide by dehydrohalogenation 4-chloro-1,3,2-dioxathiolane-2,2-dioxide (1.59 grams; 0.01 mole) and silver acetate (1.66 grams; 0.01 mole) were mixed in 15 milliliters of anhydrous acetonitrile. Within one minute after the mixing of the substances, a white cloudiness appeared in the reaction mixture, accompanied by rise in temperature of the reaction mixture from about room temperature to a temperature of 30° C. The reaction mixture was then refluxed for 15 minutes and filtered to remove silver chloride byproduct. The filtrate was analyzed by N.M.R. analysis and showed a singlet at −8.13 p.p.m. (CDCl$_3$), confirming the presence in the filtrate of the expected 1,3,2-dioxathiole-2,2-dioxide product.

Example 22.—Preparation of 1,3,2-dioxathiole-2,2-dioxide by dehydrohalogenation

The reaction reported in Example 21 was repeated, except that 15 milliliters of tetrahydrofuran were employed as reaction medium instead of the acetonitrile. After stirring of the reaction mixture for about 10 minutes at room temperature, N.M.R. analysis was carried out, showing essentially the same results as those reported in Example 21, notably a singlet at −8.00 p.p.m. (CDCl$_3$). Ten drops of nitromethane were added to the reaction mixture and the mixture refluxed for 11 hours. The reaction mixture was then filtered to remove silver chloride byproduct and solvent removed by warming on a steam bath under subatmospheric pressure. As a result of these operations, the desired 1,3,2-dioxathiole-2,2-dioxide product was obtained as a viscous residue. N.M.R. analysis of this product residue was conducted; the presence of a singlet at −8.06 p.p.m. confirmed the identity of the product.

Example 23.—Preparation of 1,3,2-dioxathiole-2,2-dioxide by dehalogenation

A solution of 24 grams of trans-4,5-dichloro-1,3,2-dioxathiolane-2,2-dioxide (0.125 mole) in 250 milliliters to tetrahydrofuran was added portionwise to a stirred suspension of 10 grams of magnesium (0.41 mole) to 10 milliliters of tetrahydrofuran activated by 0.5 milliliter of 1,2-dichloroethane. The addition was carried out at such a rate that heat generated by the reaction elevated the reaction mixture to reflux. Following the completion of the addition, the reaction mixture was refluxed for an additional 2 hours and then filtered through diatomaceous earth and the terahydrofuran removed by dropping the mixture through a steam-heated falling film still at atmospheric pressure. The mixture was then placed under subatmospheric pressure, the desired 1,3,2-dioxathiole-2,2-dioxide product being obtained in a cold trap cooled with dry ice acetone. The collected product was extracted with a minimum amount of carbon tetrachloride and the resulting extract cooled and filtered to separate the product. It was found to melt at 51.5–52.5° C.

Example 24

From 4 - chloro - 4 - methyl - 1,3,2 - dioxathiolane-2,2-dioxide and silver acetate, 4-methyl-1,3,2-dioxathiole-2,2-dioxide product having a molecular weight of 136.1.

Example 25

From trans - 4,5 - dichloro - 4 - phenyl - 1,3,2 - dioxathiolane-2,2-dioxide and magnesium in tetrahydrofuran, 4-phenyl-1,3,2-dioxathiole-2,2-dioxide product having a molecular weight of 198.2.

Example 26

From 4 - chloro - 4 - fluoro - 1,3,2 - dioxathiolane-2,2-dioxide and silver acetate, 4-fluoro-1,3,2-dioxathiole-2,2-dioxide product having a molecular weight of 140.1.

Example 27

From 4,4,5 - trichloro - 1,3,2 - dioxathiolane - 2,2-dioxide and silver acetate, 4,5-dichloro-1,3,2-dioxathiole-2,2-dioxide product having a molecular weight of 190.1.

Example 28

From trans - 4,5 - dichloro - 4,5 - diphenyl - 1,3,2-dioxathiolane-2,2-dioxide and magnesium in tetrayhdrofuran, 4,5-diphenyl-1,3,2-dioxathiole-2,2-dioxide product having a molecular weight of 274.3.

Example 29

From 4,5 - dichloro - 4 - methyl - 5 - phenyl - 1,3,2-dioxathiolane-2,2-dioxide and magnesium in tetrahydrofuran, 4-methyl-5-phenyl-1,3,2-dioxathiole - 2,2 - dioxide product having a molecular weight of 212.2.

PART IV—BROMINATED ETHYLENE SULFATES

In another embodiment, the present invention is directed to novel products of Formula IV which, as earlier set forth, is as follows:

IV
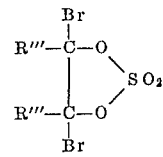

The compounds of this formula are active as agents to control the growth of algae, fungi, and other micrororganisms. As heretofore, each R''' symbol independently represents chloro, fluoro, hydrogen, methyl, or phenyl.

No method has been found whereby these brominated ethylene sulfates can be prepared by direct halogenation, as the chlorinated ethylene sulfates of Part I are prepared. However, the brominated ethylene sulfates are readily prepared by bromination of the vinylene sulfates of the previous embodiment:

III
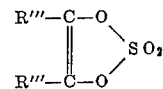

The reaction is carried out by contacting the unsaturated starting material with bromine. The contacting is conveniently carried out in an inert liquid reaction medium. Suitable such reaction media include chloroform, methylene chloride, acetic acid, and diethyl ether. The reaction goes forward readily under temperatures of a wide range; however, higher yields are obtained if the reaction is carried out in a temperature range of −20–20° C. The reaction consumes the reactants in stoichiometric amounts; however, the employment of excess bromine, such as a 1.5 to 3 fold excess, insures completion of the reaction and constitutes preferred practice.

Following the completion of the reaction, the reaction medium and any excess bromine is removed by conventional procedures, typically evaporation under subatmospheric pressure. As a result of these operations, the desired product of the present invention is obtained as a residue. This product residue can be employed directly for the useful purposes of the present invention, or it can be purified, if desired, in conventional procedures.

The following examples illustrate the present embodiment and will enable those skilled in the art to practice the same.

13

Example 30.—4,5-dibromo-1,3,2-dioxathiolane-2,2-dioxide

About 5-8 drops of bromine were added portionwise over a period of time and with stirring to 1,3,2-dioxathiole-2,2-dioxide (0.40 gram; 0.00328 mole) dissolved in a small portion of dimethylacetamide. The addition was carried out at room temperature; thereafter, the reaction mixture was held overnight at room temperature with continued stirring. At this time, the reaction mixture was colorless, indicating that all of the bromine had been reacted; however, analysis by N.M.R. spectroscopy indicated that not all of the 1,3,2-dioxathiole-2,2-dioxide starting material had been brominated. Accordingly, an additional amount of bromine (1.5 grams) was added and the reaction mixture held with stirring for an additional period of approximately forty-eight hours. At this time, N.M.R. analysis established that the 1,3,2-dioxathiole-2,2-dioxide starting material had been completely brominated. Excess bromine and solvent were removed by evaporation under subatmospheric pressure to obtain the desired 4,5-dibromo-1,3,2-dioxathiolane-2,2-dioxide product as a residue. This product residue was recrystallized from n-hexane/ether, the recrystallized product thus obtained melting at 69–70.5° C.

Other products of this embodiment are as follows:

Example 31

From bromine and 4-methyl-1,3,2-dioxathiole-2,2-dioxide, 4,5-dibromo-4-methyl-1,3,2-dioxathiolane-2,2-dioxide product having a molecular weight of 296.

Example 32

From bromine and 4-phenyl-1,3,2-dioxathiole-2,2-dioxide, 4,5-dibromo-4-phenyl-1,3,2-dioxthiolane-2,2 - dioxide product having a molecular weight of 358.

Example 33

From bromine and 4-fluoro-1,3,2-dioxathiole-2,2-dioxide, 4,5-dibromo-4-fluoro-1,3,2-dioxathiolane-2,2 - dioxide product having a molecular weight of 300.

Example 34

From bromine and 4,5-dichloro-1,3,2-dioxathiole-2,2-dioxide, 4,5-dibromo-4,5-dichloro-1,3,2-dioxathiolane-2,2-dioxide product having a molecular weight of 434.1.

Example 35

From bromine and 4,5-diphenyl-1,3,2-dioxathiole-2,2-dioxide, 4,5-dibromo-4,5-diphenyl-1,3,2-dioxathiolane - 2,2-dioxide product having a molecular weight of 434.1.

Example 36

From bromine and 4-methyl-5-phenyl-1,3,2-dioxathiole-2,2-dioxide, 4,5-dibromo-4-methyl-5-phenyl - 1,3,2 - dioxathiolane-2,2-dioxide product having a molecular weight of 372.0.

As noted foregoing, the products of each of Formulae I, II, III, and IV are useful as agents to control the growth, that is, to inhibit, kill, and otherwise adversely effect the growth, of bacteria, fungi, and other microorganisms. Thus, the products give excellent control of organisms such as *Areobacter aerogenes; Bacillus subtilis; Pseudomonas aeruginosa; Salmonella typhosa; Staphylococcus aureus; Aspergillus terreus; Pullularia pullulans; Rhizopus nigricans; Tricophyton mentagrophytes;* and the like.

When a product of any embodiment of the present invention is employed for its biological activities, the unmodified product can be utilized. However, the present invention also encompasses the utilization of the product together with an adjuvant. For example, the product can be dispersed on a finely divided solid and the resulting preparation employed as a dust. Also, a product of the present invention, or a composition comprising a product of the present invention and a finely divided solid, can be dispersed in water with the aid of a wetting agent and the

14 resulting aqueous suspension employed as a spray. In other procedures, a product according to the present invention can be employed as the constituent of organic liquid compositions, oil-in-water or water-in-oil emulsions, or water dispersions, with or without the addition of a wetting, dispersing, or emulsifying agent.

In representative operations, a bacteriological culture medium containing 0.05 percent, by weight, of 4,5-dibromo-1,3,2-dioxathiolane-2,2-dioxide gave 100 percent kill and control of *Aspergillus terreus, Pullularia pullulans* and *Rhizopus nigricans.*

We claim:
1. Compound of one of the formulae:

III 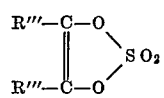

IV 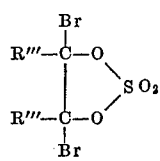

and

V 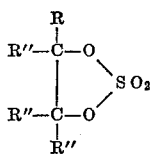

wherein R represents chloro or fluoro; R' represents hydrogen, methyl, or phenyl; each R" represents R or R', there being at least one R" moiety which represents R'; and each R''' independently represents chloro, fluoro, hydrogen, methyl or phenyl.

2. The compound of claim 1 which is of Formula V.
3. The compound of claim 2 wherein R represents chloro.
4. The compound of claim 3 wherein each R" represents hydrogen.
5. The compound of claim 2 wherein R represents fluoro.
6. The compound of claim 5 wherein each R" represents hydrogen.
7. The compound of claim 1 which is of Formula III.
8. The compound of claim 7 wherein each R" represents hydrogen.
9. The compound of claim 1 which is of Formula IV.
10. The compound of claim 9 wherein each R" represents hydrogen.
11. Process for the chlorination of an ethylene sulfate compound of the formula

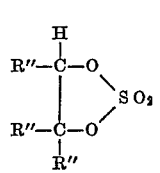

wherein R represents chloro or fluoro; R' represents hydrogen, methyl, or phenyl; and R" represents R or R', there being at least one R" moiety which represents R', which process comprises contacting the ethylene sulfate with elemental chlorine under the influence of ultraviolet radiation.

12. The process of claim 11 wherein the ethylene sulfate is 1,3,2-dioxathiolane-2,2-dioxide.

13. Process for the synthesis of a compound of the formula:

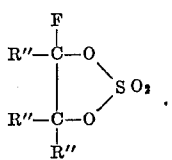

which comprises contacting silver tetrafluoroborate with a starting compound of the formula:

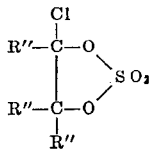

wherein, in said starting compound, R represents chloro or fluoro; R' represents hydrogen, methyl, or phenyl; and R'' represents R or R', there being at least one R'' moiety which represents R'.

14. The process of claim 13 wherein the starting compound is a compound of the formula:

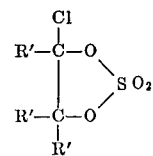

References Cited

Wagner et al.: Synthetic Organic Chem., Wiley, N.Y. (1953), page 40.

JAMES A. PATTEN, *Primary Examiner.*

U.S. Cl. X.R.

204—158; 260—999